(12) United States Patent
Bosko

(10) Patent No.: US 7,264,731 B2
(45) Date of Patent: Sep. 4, 2007

(54) SYSTEMS AND METHODS WITH TREATED WATER

(76) Inventor: Robert S. Bosko, 3010 James Lovell Dr., San Antonio, Bexar County, TX (US) 78219

( * ) Notice: Subject to any disclaimer, the term of this patent is extended or adjusted under 35 U.S.C. 154(b) by 861 days.

(21) Appl. No.: 10/045,301

(22) Filed: Oct. 26, 2001

(65) Prior Publication Data
US 2003/0080034 A1  May 1, 2003

(51) Int. Cl.
| B01D 61/00 | (2006.01) |
| F25C 1/24 | (2006.01) |
| B67D 5/62 | (2006.01) |
| A23L 2/00 | (2006.01) |
| B01D 63/00 | (2006.01) |

(52) U.S. Cl. .................. 210/652; 62/344; 62/139; 62/114; 222/146.6; 426/590
(58) Field of Classification Search ............... 210/652; 62/344, 139, 114; 222/146.6; 426/590; 99/323.2
See application file for complete search history.

(56) References Cited

U.S. PATENT DOCUMENTS

| 4,176,063 | A | 11/1979 | Tyler |
| 4,761,295 | A | 8/1988 | Casey |
| 5,039,411 | A | 8/1991 | Miller et al. |
| 5,256,279 | A | 10/1993 | Voznick et al. |
| 5,350,085 | A * | 9/1994 | Kidd et al. .................. 222/1 |
| 5,536,411 | A * | 7/1996 | Blades .................. 210/638 |
| 5,927,099 | A | 7/1999 | Bosko |
| 5,992,685 | A * | 11/1999 | Credle, Jr. .................. 222/1 |
| 6,093,312 | A * | 7/2000 | Boulter .................. 210/86 |
| 6,241,893 | B1 | 6/2001 | Levy |
| 2002/0175127 | A1* | 11/2002 | Crowley et al. |

FOREIGN PATENT DOCUMENTS

WO  WO98/12489 A1  3/1998

* cited by examiner

Primary Examiner—Krishnan S. Menon

(57) ABSTRACT

Units (10), systems (100), and methods with treated water are provided in which a treated water source (12, 104) is included integrally in a host piece of equipment (10, 102). The host piece of equipment (10, 102) includes host functions such as ice making (14, 106). Other equipment, such as dispenser (108) may be coupled to the equipment (102) to share the treated water from treated water source (104).

23 Claims, 2 Drawing Sheets

SYSTEMS AND METHODS WITH TREATED WATER

TECHNICAL FIELD OF THE INVENTION

This invention relates generally to systems and methods that use treated water.

BACKGROUND OF THE INVENTION

Various factors have led to an increasing need for local water treatment. These factors include, among others, stresses on large (such as municipal) supply water treatment systems, the absence of supply water treatment systems (for example in developing areas), and the need for higher water quality than that provided by supply treatment systems.

Significant efforts are being expended to reduce costs and improve the efficiency of local water treatment systems, which include various technologies, including, without limitation, reverse osmosis ("R/O") treatment systems, filter based systems, contact or heat based systems, and radiation (such as ultraviolet) based systems, among others. However, these treatment systems are handled and designed as stand-alone systems that supply other systems. Thus, for example, a restaurant may include a water treatment system which is separate from and supplies water for various needs, including ice-making and beverage dispensing.

Unfortunately, certain disadvantages arise when water treatment is viewed as a separate process. Therefore, a need has arisen for methods and systems in which water treatment is incorporated as an integral component of an overall system or piece of equipment.

SUMMARY OF THE INVENTION

In accordance with the teachings of the present invention, methods and apparatus that use treated water are provided that substantially eliminate or reduce problems associated with prior art systems.

In a particular embodiment, a water-using unit is provided that includes a treated water source integral with the unit, a host system that performs host functions, with the host system coupled to the treated water source. A control system is coupled to and controls operation of the treated water source and the host system.

In particular embodiments, the treated water source comprises an R/O system, a reservoir for storing treated water, or a combination of these. Also, where a cooling source is included in the unit, a reservoir may be located proximate the cooling source. For efficiency increases, where condensers are included in the unit, inlet or reject water may be passed proximate the condenser to assist in heat removal.

In particular applications, the host system may comprise an ice making system. Also, a reservoir may be located proximate freezer plates or the ice bin of the ice making system. In a particular embodiment of an ice making system, a control system pulses water across the freezer plates. Also, water not frozen in the ice making system may be returned to the reservoir.

In another particular application, the host system may comprise a beverage dispensing system. In a particular embodiment, the beverage dispensing system includes a carbonator, at least one supply of syrup, and a plain water circuit for non-carbonated water, such that carbonated and non-carbonated beverages may be dispensed. Also, at least one supply of flavor may be included, such that flavors may be added to the carbonated and non-carbonated beverages.

Also provided is a system that includes a water-using unit having a treated water source integral with the unit and a host system performing host functions, with the host system coupled to the treated water source. A separate unit, remote from the water-using unit, is coupled to the treated water source. In particular embodiments, the treated water source comprises a reverse osmosis system, a reservoir, or a combination of these.

In particular applications of the system, the host system comprises an ice making system. The separate unit may comprise a beverage dispenser. In another particular application, the host system comprises a beverage dispensing system. The separate unit may comprise an ice maker.

Important technical advantages are achieved with the present invention, including lower manufacturing, installation, and maintenance costs. Also, among other advantages, inclusion of an integral source of treated water with host units allows for the technical advantage of higher efficiencies than would achieved if the water treatment was separate from the host unit.

BRIEF DESCRIPTION OF THE DRAWINGS

Reference is made in the description to the following briefly described drawings, wherein like reference numerals refer to corresponding elements.

DETAILED DESCRIPTION OF THE INVENTION

Figure 1:
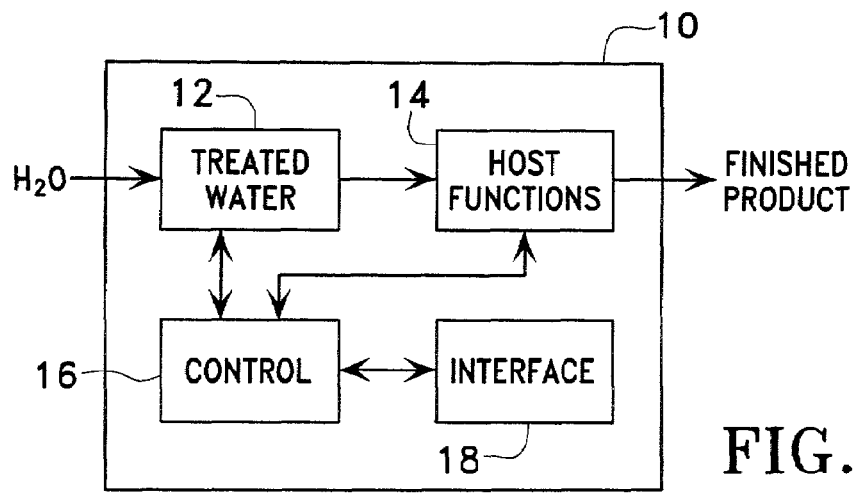
FIG. 1 illustrates a particular embodiment of a unit that incorporates an integral treated water source according to the teachings of the present invention.

FIG. 1 illustrates a piece of equipment (or unit) 10 that incorporates an integral treated water source 12. The unit 10 is a water-using unit that performs host functions with the treated water from treated water source 12. For example, if the unit 10 is an ice maker, then the treated water will be used to make ice. Similarly, if the unit 10 is a beverage dispenser, the treated water will be used in preparing finished beverages. These "host functions" are represented by host functions 14 of FIG. 1.

Treated water source 12 may be any source of treated water, but preferably is a source of water from a reverse osmosis ("R/O") system. Thin film composite membranes ("TFC") or thin film membranes ("TFM") such as those made by the Dow Chemical Company under the trademark Filmtec, may be used as the R/O membrane. However, this is illustrative only, and any R/O device may be used.

Also shown in FIG. 1 is control unit 16. Control unit 16 is an electronic control unit that controls unit 10, and in particular the treated water source 12 and the host functions 14. The control system 16 may include a microprocessor or microcontroller, and various inputs and output ports to effect the control. The control system 16 interfaces with various sensors or switches to control operation. Also, the control system 16 is coupled to interface 18. Interface 18 represents an interface system for local or remote access, such as, without limitation, by a user or for remote monitoring, data gathering, or two-way communications or downloads. Such electronic controls may be used to control each of the embodiments discussed herein.

By designing equipment with an integral treated water source, significant advantages are achieved. For example, as will be discussed in detail below, water and energy conservation can be significantly enhanced, for example by using input or drain water to cool the condenser in systems that include vapor compression refrigeration systems. Furthermore, manufacturing and maintenance costs are reduced, because the treated water source is built in as part of the host equipment, thereby eliminating the need for two cabinets, two sets of electronic controls, and other redundant systems. Similarly, installation costs are greatly reduced, as only one piece of equipment needs to be installed. Also, among other advantages, the sensors that can be used to control the treated water source may also be used to control other elements of the host system, thereby providing more design flexibility and further reducing costs.

Figure 2:
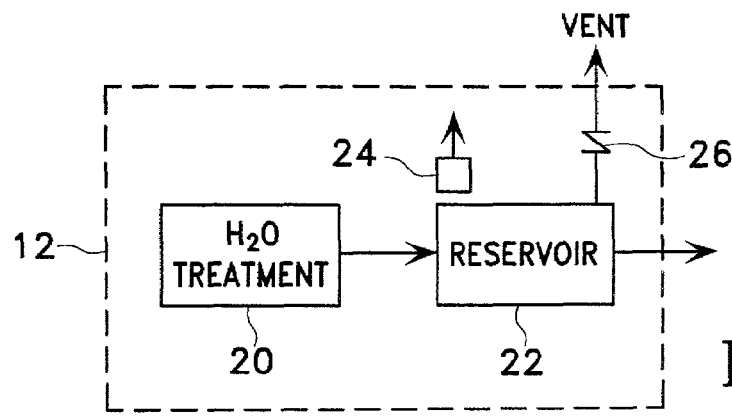
FIG. 2 illustrates a particular embodiment of a treated water source according to the teachings of the present invention.

FIG. 2 illustrates a particular embodiment of a treated water source 12. As shown in FIG. 2, treated water source 12 may include a water treatment unit 20, such as an R/O unit, coupled to a reservoir 22. The reservoir 22 is preferably a flexible laminate bag. An external proximity sensor 24 is included to detect when the reservoir 22 is full (the bag presses against the sensor). In the full condition, the proximity sensor 24 sends a signal to the control system 16 to stop the flow of treated water to the reservoir 22. Although a proximity switch 24 is illustrated, it should be understood that other sensors (such as, without limitation, float switches) may be used without departing from the intended scope of the present invention. However, it is preferable for the sensors to be external to the treated water reservoir 22, to minimize contamination issues. In a preferred embodiment, both the water treatment unit 20 and the reservoir 22 are included as part of the host unit 10. However, the treated water source 12 may comprise the reservoir only, with the water treatment unit 20 external to or remote from the unit 10. Thus, for clarity, the treated water source of the present invention may include the combination of a water treatment unit and a reservoir, or either one alone (for example, without limitation, where the water treatment unit is external to or remote from the host, or where no reservoir is needed if the water treatment unit can supply sufficient quantities of treated water on demand). It should also be understood that even where a treated water unit can supply sufficient quantities of treated water on demand, it is still desirable (although not necessary) to include a reservoir, for the efficiency advantages discussed herein.

Furthermore, it should be understood that, although a flexible laminate bag is preferred, other reservoirs, such as permanent tanks or replaceable tanks (for example, without limitation, those made of plastic), may be used. The use of a flexible bag as reservoir 22 reduces contamination issues and provides other advantages, such as lower costs and easy cleaning, since the flexible bag can be replaced periodically, if necessary. U.S. Pat. Nos. 5,256,279 and 5,927,099, which are herein incorporated by reference in their entirety, disclosed particular combinations of water treatment systems with flexible bags that may be used, among others, as particular embodiments of water treatment systems in the present invention. Also shown in FIG. 2 is a vent (through check valve 26), which may be used to vent off unwanted gases, such as $CO_2$. In the case of $CO_2$, for example, this vent keeps the water from being too acidic (and thus aggressive and potentially harmful to equipment), which acidity may occur with R/O water.

By using reservoir 22, a relatively small water treatment unit, and in particular a small R/O unit, may be used, thus lowering the costs from those that would be expended if an R/O unit were configured to supply water on demand. In particular, the reservoir allows storage of treated water produced during low demand periods. No reservoir is needed (although it may still be desirable) if the water treatment unit can supply sufficient quantities of water on demand. Also, systems other than or in addition to an R/O unit may be used, including, without limitation, pre-filter carbon filter systems.

In particular embodiments, the treated water source may comprise some or all of the elements and advantages of those disclosed in pending U.S. patent application Ser. No. 09/912,868 (filed Jul. 25, 2001), Ser. No. 09/773,381 (filed Jan. 31, 2001), and ser. No. 09/775,116 (filed Feb. 1, 2001), entitled "Self Cleaning Pre-Filter System," "Microbial Resistant Water Purification and Collection System," and "Constant Pressure Filtered Water Delivery System," respectively, all of which are commonly owned by the inventor or licensee of the present application, and which are herein expressly incorporated by reference, in their entirety.

Figure 3:
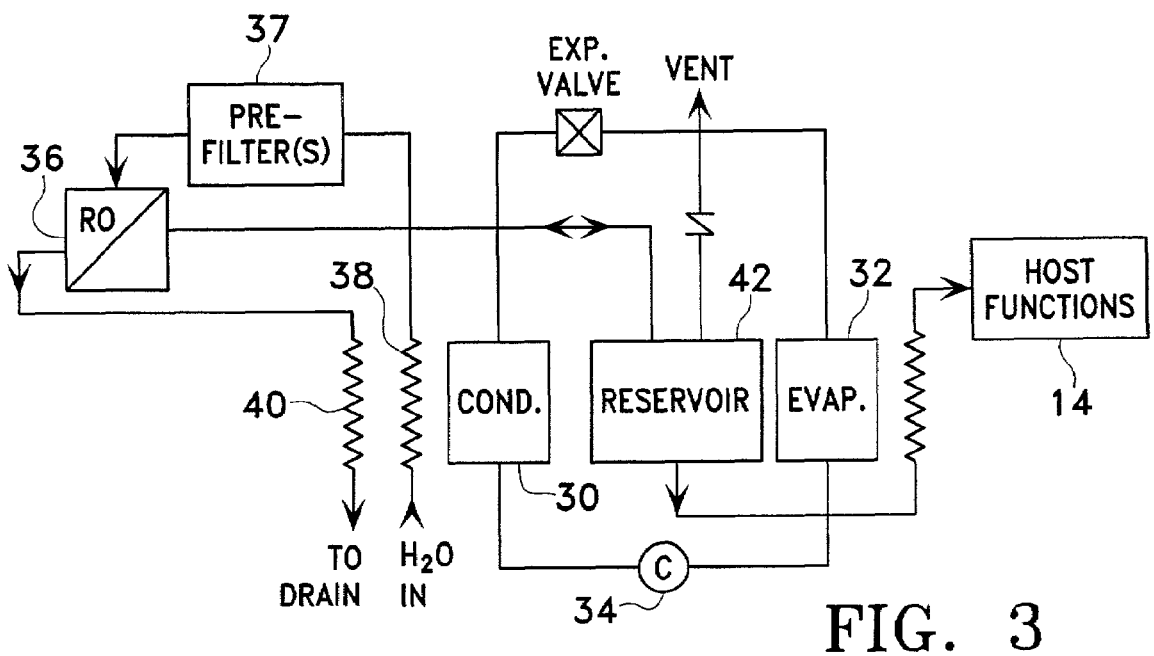
FIG. 3 illustrates a particular embodiment of a treated water source according to the teachings of the present invention.

FIG. 3 illustrates a more detailed example of a particular treated water source according to the teachings of the present invention, incorporated in a unit that includes a cooling unit for cooling water and/or producing ice. The cooling unit shown in FIG. 3 is a vapor compression cycle refrigeration system that includes a condenser 30 and an evaporator 32. A compressor 34 pumps refrigerant from the evaporator 32 to the condenser 30. Although vapor compression systems are discussed herein, any cooling system may also be used, including for example, without limitation, Stirling cycle refrigeration.

Water is provided to R/O system 36 from an external water supply, such as a municipal supply, and may be filtered through pre-filters 37 (which may be, without limitation, carbon-block filters, or any other suitable filter). In the particular embodiment illustrated, the inlet water is transmitted through a coil 38 located in close proximity to condenser 30. This approach preheats the water to the R/O system 36, improving the efficiency of the R/O unit (thus conserving water), and also improving the efficiency of the refrigeration unit by assisting in condensation across condenser 30 (thus conserving energy). Similarly, the reject water from R/O unit 36 may be passed through coil 40 to assist in condensation across condenser 30. It should be understood, however, that these circuits 38 and 40 are preferable, but need not be included.

While pre-heating the inlet water assists in R/O treatment efficiency, it then requires further cooling of the water by evaporator 32. Thus, a balance should be made between the most efficient use of energy and water, depending on the demands of the application. In most cases, overall efficiency should be improved by using reject water from the R/O unit 36 to assist in condensation across condenser 30.

Treated water from the R/O unit 36 is stored in a reservoir 42, which may be a reservoir as discussed above in connection with FIG. 2 (water may also flow back from the reservoir to the R/O unit 36 for back-flushing of the R/O unit 36). In a preferred embodiment, the reservoir 42 is located in close proximity to evaporator 32 or other cooling source (such as, without limitation, ice in the ice bin of an ice maker or dispenser), to cool (pre-chill) the water within the reservoir 32. Thus, with the system shown in FIG. 3, a reservoir of relatively cold water (because of the reservoir's proximity to the cooling source) is available for use by the host system. This pre-chilling increases the efficiency of the host system's functions. Such host functions may include, without limitation, ice-making, beverage dispensing, and storage of cool water (for example for dispensing of cold water). Other host functions are also within the scope of the present invention, including those that do not require cooling, such as, and without limitation, bread steaming, coffee making, and tea making.

Figure 4:
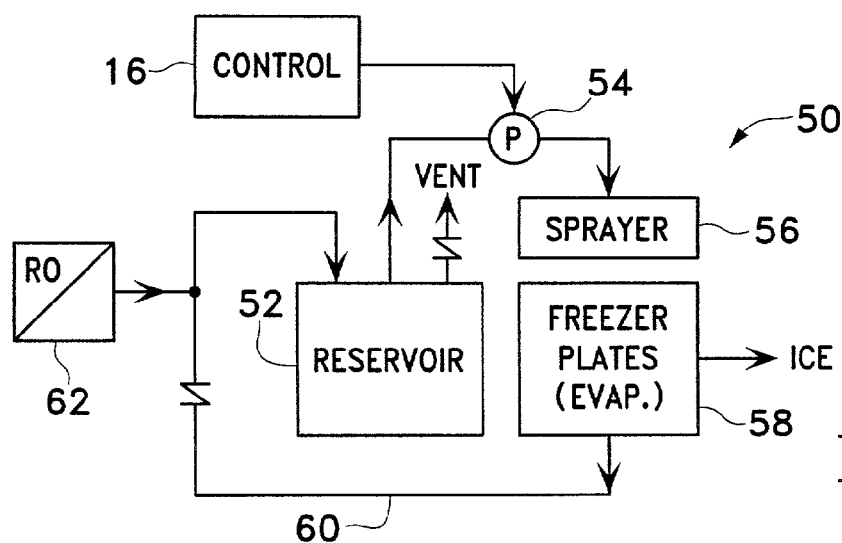
FIG. 4 illustrates a particular embodiment of an ice maker according to the teachings of the present invention.

FIG. 4 illustrates a particular application of the present invention in the form of an ice maker 50. As shown in FIG. 4, treated water from a reservoir 52 is pumped with a pump 54 to a sprayer 56. Sprayer 56 sprays water across freezer plates 58 to make ice (the freezer plates are generally the evaporator of a vapor compression system, though they need not be). The ice is ejected into an ice bin. As shown, the reservoir 52 is in close proximity to the freezer plates 58, thus pre-chilling the water before being sprayed on the freezer plates 58. The reservoir 52 may also be located in close proximity to (including in) the ice storage bin, to achieve pre-chilling. This close proximity significantly increases the efficiency of the ice maker 50. Furthermore, any water that is not frozen on the freezer plates 58 is drained, via a return line 60, back to the reservoir 52, thus conserving water and the energy that would be wasted by sending cooled water down a drain. The reservoir 52 is supplied from R/O unit 62. As discussed above, the R/O unit 62 (which represents any kind of water treatment unit) is preferably integrally made with the ice maker 50. However, the unit 62 may be external to or remote from the ice maker 50. The elements and advantages discussed in connection with FIG. 3 may also be included in connection with FIG. 4.

As shown in FIG. 4, control system 16 is coupled to pump 54 to control the pump. In a particular embodiment, the pump 54 is controlled to pulse water through the sprayer 56, thus resulting in a pulsing spray over the freezer plates 58. By pulsing the spray, significant reductions in unfrozen water across the freezer plates 58 are achieved. This greatly improves the efficiency of the ice maker of the present invention over existing systems, since very little energy is expended in chilling water that does not result in ice formation. With prior art systems, much water is chilled but not frozen, and then sent to a drain, thus completely losing the energy spent in reducing the temperature of that unfrozen water. With the present invention, chilled but unfrozen water is greatly reduced, and, to the extent it is created, it is recycled back into reservoir 52, thus conserving much of that energy. In the particular embodiment shown, pump 54 is controlled to control the pulsing. However, other control approaches may be used, such as, without limitation, controlling the sprayer to mechanically pulse.

Another important advantage of the ice maker 50 of FIG. 4 is the use of RIO water as the source water for the ice. Because R/O water has a better surface melting characteristic, the need for harvest assist cycles that exist with present ice makers (in which warm water is used to crack ice off the freezer plates) is reduced or eliminated. Treated water may be supplied to and from the bottom of the reservoir 52 so that, where harvest assist cycles are used, relatively warmer water, generated by the R/O unit 62 and having spent less time being chilled, is available for the harvest assist.

Furthermore, with prior art systems, purge cycles are required when water is not used, to remove dissolved solids that stay in solution and then concentrate and collect in sumps. With the use of R/O treated water in the present ice maker 50, no such purge cycle is needed, thereby conserving energy and water.

Figure 5:
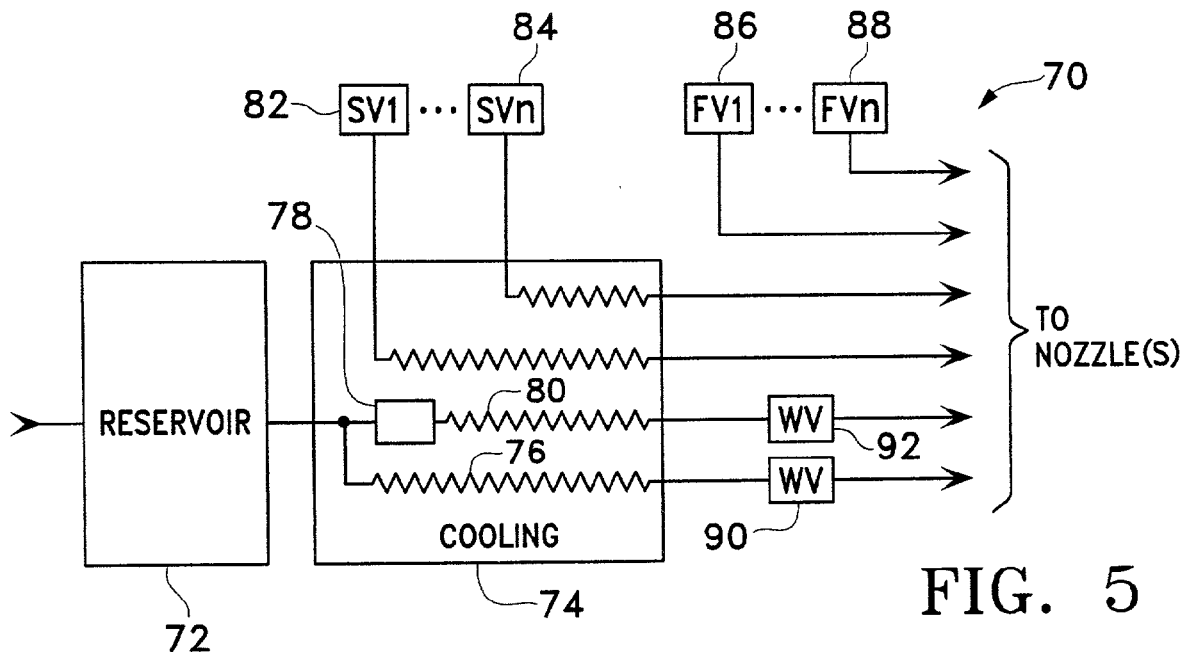
FIG. 5 illustrates a particular embodiment of a beverage dispensing system according to the teachings of the present invention.

FIG. 5 illustrates a particular application of the present invention in the form of a beverage dispenser 70. The reservoir 72 is supplied from a water treatment unit (preferably an R/O unit), which, as discussed above, may be integral, outside of, or remote from the dispenser 70. As discussed above, by using a reservoir, a relatively small water treatment unit may be used, thus lowering the costs from those that would be expended if the treatment unit were configured to supply water on demand.

Water from the reservoir 72 is transmitted through a cooling unit 74. Cooling unit 74 may be, without limitation, a cold plate or an ice/water bath cooled by an evaporator of a vapor compression refrigeration system. It should be understood, however, that other cooling sources may be used (in this embodiment or any other embodiment discussed herein). Water from the reservoir 72 can be split into two streams, one for plain water and one for carbonated water. A plain water cooling coil 76 is shown for cooling the plain water. A carbonator 78 carbonates water which is then cooled through cooling coil 80. Carbonator 78 is shown within cooling unit 74 (to allow for high efficiency cold carbonation), however, carbonation may occur remotely. Thus, as shown in FIG. 5, both plain water and carbonated water circuits are provided.

Beverage syrups are supplied through syrup valves 82 through 84 (which represent a plurality of valves). These syrups may be supplied from a bag-in-box and pump type system, or any other suitable system. The syrups also flow through the cooling unit 74 for cooling. The syrup valves 82 through 84 are shown as valving the syrup before cooling of the syrups through the cooling unit 74. However, it should be understood that the valves may be located after the cooling unit 74. Also shown in FIG. 5 are flavor valves 86 through 88 (which represent a plurality of valves) used for the supply of the flavors, such as without limitation, vanilla and lemon. The plain and carbonated water circuits are valved through water valves 90 and 92 (which may be located before or after cooling). Also, devices other than valves, such as, without limitation, metering pumps, may also be used throughout without departing from the intended scope of the present invention.

To form finished beverages, the control system controls the valves, in response to user requests, to transmit the appropriate syrups and water to nozzles for dispensing. Thus, as shown in FIG. 5, carbonated water, plain water, carbonated and non-carbonated beverages, and flavored variations thereof may be dispensed with the present invention.

As discussed above in connection with the other figures, the reservoir 72 may be located in close proximity to the cooling unit 74 (including, without limitation, near the cold plate or ice that cools the cold plate in a cold-plate type dispenser), to pre-cool the water in the reservoir 72. Also, where the beverage dispenser is the type that also includes an ice maker, the reservoir 72 may be located in close proximity to the ice bin or to the evaporator of ice maker. The elements and advantages discussed above in connection with the other figures, for example FIG. 3, may also be combined with this embodiment, or any other embodiment discussed herein.

Figure 6:
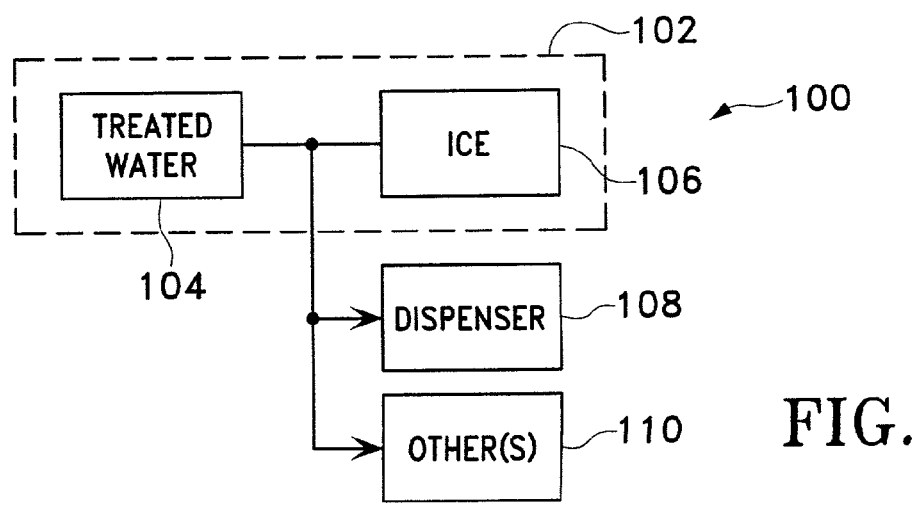
FIG. 6 illustrates a particular embodiment of a system that shares a treated water source according to the teachings of the present invention.

FIG. 6 illustrates a particular embodiment of a shared treated water system 100 according to the teachings of the present invention. As shown in FIG. 6, a water-using unit, piece of equipment (or unit) 102, includes an integral treated water source 104. This treated water source 104 is preferably an R/O system and reservoir as discussed above in connection with the other examples. However, any other water treatment system may be used to generate the treated water, and, as discussed above, the reservoir may be integral with the unit 102, with the device that generates the treated water being integral, external to, or remote from the unit 102. In the particular example shown, unit 102 is an ice maker, and thus includes host ice machine functions 106. As part of unit 102, treated water source 104 supplies water to the host ice functions 106, but is also available to supply external pieces of equipment, such as beverage dispenser 108 or other devices 110 (for example, without limitation, coffee machines and bread steamers).

With the system 100 shown in FIG. 6, treated water from the unit 102 can be supplied to the entire system, which may reside, for example, without limitation, at a restaurant or convenience store. Thus, treated water is available to improve quality, at a relatively low cost. For example, with the treated water source 104 included as part of equipment 102, manufacturing, installation, and maintenance costs are significantly reduced. Also, lower maintenance cost result for all the pieces of equipment since they do not need to be cleaned of untreated water deposits, as is required today.

Although the particular piece of equipment 102 shown in FIG. 6 is an ice maker, the treated water source 104 may be included in connection with another host unit, rather than or in addition to an ice machine, such as a dispenser.

To connect the other pieces of equipment, such as dispenser 108 and others 110 shown in FIG. 6, to the treated water source 104, one or more fittings are provided as part of unit 102, for coupling these other pieces of equipment to the treated water source 104. Of course, within unit 102, the treated water source 104 shown in FIG. 6 may be configured as shown in the previous examples to obtain those advantages.

The particular descriptions provided herein are illustrative examples, and features and advantages of each example can be interchanged with, or added to the features and advantages in the other embodiments and examples herein. And, in general, although the present invention has been described in detail, it should be understood that various changes, alterations, substitutions, additions and modifications can be made without departing from the intended scope of the invention, as defined in the following claims.

What is claimed is:

1. A water-using unit, comprising:
   a cabinet:
   a treated water source sharing at least part of said cabinet such that said treated water source is integral with the water-using unit, said treated water source comprising a reverse osmosis water treatment system including a flexible reservoir in which water treated by said reverse osmosis water treatment system is stored;
   a host system performing host functions, said host system coupled to said cabinet and to said treated water source, said host system comprising a cooling source, and wherein said reservoir is located in cooling proximity to said cooling source so as to allow cooling of said water in said flexible reservoir; and
   a control system coupled to and controlling operation of said treated water source and said host system.

2. The unit of claim 1, and further comprising:
   a condenser coupled to said host system; and
   reject water generated by said reverse osmosis water treatment system, said reject water passing proximate said condenser to assist in heat removal.

3. The unit of claim 1, and further comprising:
   a condenser coupled to said host system; and
   inlet water, said inlet water passing proximate said condenser to assist in heat removal.

4. The Unit of claim 1, wherein said host system comprises an ice making system.

5. The unit of claim 1, wherein said cooling source comprises an evaporator.

6. The unit of claim 1, wherein said cooling source comprises ice.

7. The unit of claim 4, wherein said control system causes water to be pulsed in said ice making system.

8. The unit of claim 4, wherein water not frozen in said ice making system is returned to said reservoir.

9. The unit of claim 1, wherein said host system comprises a beverage dispensing system.

10. The unit of claim 9, wherein said beverage dispensing system includes:
    a carbonator coupled to said reservoir, said carbonator generating carbonated water:
    at least one supply of syrup; and
    a plain water circuit for non-carbonated beverages, such that carbonated and non-carbonated beverages may be dispensed.

11. The unit of claim 10, and further comprising at least one supply of flavor, such that flavors may be added to the carbonated and non-carbonated beverages.

12. A system, comprising:
    a water-using unit having a cabinet and a first user access area, said water-using unit including a treated water source sharing at least part of said cabinet such that said treated water source is integral with said water-using unit and further including a host system performing host functions, said host system coupled to said treated water source; and
    a separate unit remote from said water-using unit such that said separate unit does not share said cabinet, said separate unit having a second user access area, said separate unit supplied by said treated water source, and wherein said first and second user access areas are not presented as a combined user access area.

13. The system of claim 12 wherein said treated water source comprises a reverse osmosis system.

14. The system of claim 13, wherein said treated water source further comprises a reservoir coupled to said reverse osmosis system.

15. The system of claim 12 wherein said treated water source comprises a reservoir.

16. The system of claim 15, and further comprising a cooling source, said reservoir located in cooling proximity to said cooling source.

17. The system of claim 12, wherein said host system comprises an ice making system.

18. The system of claim 17, wherein said separate unit comprises a beverage dispenser.

19. The system of claim 17, wherein:
    said treated water source comprises a reservoir; and
    said ice making system includes a cooling source, said reservoir located in cooling proximity to said cooling source.

20. The system of claim 12, wherein said host system comprises a beverage dispensing system.

21. The system of claim 20, wherein said separate unit comprises an ice maker.

22. The system of claim 20, wherein said treated water source comprises a reverse osmosis system and a reservoir, said reservoir coupled to said beverage dispensing system.

23. A water-using unit, comprising:
    a cabinet;
    a treated water source sharing at least part of said cabinet such that said treated water source is integral with the water-using unit, said treated water Source comprising a reservoir;
    a host system performing host functions, said host system coupled to said cabinet and to said treated water source;
    a control system coupled to and controlling operation of said treated water source and said host system; and
    a cooling source located in cooling proximity to said reservoir so as to allow cooling of said reservoir.

* * * * *